United States Patent Office 2,785,151
Patented Mar. 12, 1957

2,785,151

PROCESS FOR TREATING TALL-OIL WITH UREA, AND PARTICULARLY A NEW FORM OF EXPANDED UREA

Manuel H. Gorin and Ludwig Rosenstein, San Francisco, Calif.

No Drawing. Application October 14, 1952, Serial No. 314,744

2 Claims. (Cl. 260—96.5)

This invention relates to the segregation of tall-oils and tall-oil fractions and other mixtures of high molecular weight fatty acids into their various constituents by means of a new form of urea; the invention also includes the preparation of this new form of urea.

Tall-oil is a by-product of the Kraft pulp industry. It consists of a complex mixture of rosin acids, saturated and unsaturated fatty acids, and non-acidic constituents. Present processes for resolving it into its components are presently based on (a) fractional distillation or (b) fractional extraction with various solvents. These accomplish only a partial separation, whereas the process of the present invention accomplishes a far more complete separation.

The present process is best applied to the tall-oil components which result from a prelimiary flash vacuum distillation. Such distillate is free from the heavy solid residues generally known as "tall-oil pitch." However, we do not limit our invention to application to such distillate for it may also be applied to the crude tall-oil. We will hereafter use the term "tall-oil" to include crude tall-oil and the various fatty-acid-containing-fractions thereof produced by known means such as solvent extraction, distillation or combinations of these.

We have found that when solid urea is brought into contact with tall-oil, the fatty acids, both saturated and unsaturated, form a solid phase with urea while the rosin acids and non-acidic components remain in the liquid phase. The two phases are then separated and the urea-fatty acid solid phase decomposed to separate the urea and the fatty acids.

It is preferable, for the ease of manipulation, first to dissolve the tall-oil in a solvent which does not have the ability to form a solid phase with urea and which is not a solvent for urea. As suitable solvents, we mention butane, pentane, hexane, benzol, toluol and, in general, hydrocarbons of low molecular weight. The concentration of the tall-oil solution is important, but there is no critical concentration short of the dilution below which fatty acids no longer pass into the solid phase. An important criterion is ease of handling and in practice we have found that a solution of tall-oil with an equal volume of solvent is readily manipulated. However, the more concentrated the solution, the more complete is the transfer of the fatty acids to the solid phase when urea is present.

When urea in its usual well-known crystalline form is employed, the formation of a urea-fatty acid solid phase is relatively slow. This formation of the fatty acid-urea solid phase can be hastened by utilizing the new form of urea which we have discovered, or by utilizing an accelerator, e. g. a urea solvent such as methanol, ethanol, acetone, etc., for these hasten the action in a very marked way. Their use brings with it problems of recovery and recycle of the accelerator, and therefore the use of the new highly reactive urea solid phase without an accelerator leads to important process simplification.

We have found that there is a special form of solid urea which has the property of combining very rapidly with substances capable of forming such combinations, without the presence of an accelerator. This special form of urea is that which is recovered from the solid phase urea-organic compound when this latter is decomposed by heat while immersed in an organic liquid which is not a solvent for urea. This new solid form of urea is immediately recognizable by its physical appearance, being light and fluffy, in contra-distinction to the dense character of the original urea crystals, and being apparently a pseudo-morph of the solid phase urea-organic compound which is also light and fluffy; the gross volume of the solid phase urea-organic compound does not decrease noticeably when the organic compound is removed with a non-urea solvent at a temperature below the melting point of urea. In addition, it is exceedingly reactive, rapidly taking up certain organic compounds from the liquid phase. Such urea is further characterized by an unusually low bulk-density compared with that of ordinary urea. Expanded urea has a bulk-density of approximately 0.45 gram per cubic centimeter, and in any case not exceeding 0.50 gram per cubic centimeter. Ordinary urea of either reagent or commercial grade after grinding has a bulk-density of approximately 0.75 gram per cubic centimeter. No degree of grinding alters it to less than 0.70 gram per cubic centimeter. Bulk density was measured by adding successive portions of the powder to a 50 cc. graduated cylinder, being careful to jar and tap the cylinder after each addition. When approximately 20 cc. had been added, the cylinder was jarred and tapped till no further change in volume occurred. The weight and volume were then recorded. The ratio of weight to volume is the bulk-density.

To show the difference in reaction rate with respect to adduct formation the following experiment is quoted:

Urea in two different forms was used:

A. Expanded urea prepared by decomposing the adduct of urea and lauric acid by suspending in toluol and heating to 110° C. for approximately 15 minutes.

B. Merck reagent urea ground to an impalpable powder.

For the test substance a solution of "double distilled cottonseed fatty acids" dissolved in hexane was used. Equal amounts of the two forms of urea were introduced simultaneously into separate equal portions of the fatty-acid-hexane solutions. The suspensions were kept well agitated in closed vessels at 20° C. At various times, samples of the clear liquid were taken and the fatty-acid content thereof determined by titration with standard KOH in the usual manner. From the results, the percent fatty acids which had combined was calculated.. Table I gives the results.

TABLE I

| Elapsed Time | Mol Percent Fatty Acids to Solid Phase | |
|---|---|---|
| | Expanded Urea | Ground Reagent Urea |
| 14 minutes | 20 | 0 |
| 34 minutes | 27.6 | 0 |
| 52 minutes | 29.4 | 0 |
| 76 minutes | 33.6 | 0 |
| 699 minutes | | 11 |
| 704 minutes | 41.1 | |

These figures show that expanded urea has combined with 33.6% of the fatty acids present in 76 minutes whereas the finely ground ordinary urea showed no measurable reaction in this time. 43.3% of the fatty acids present is the most that could have been taken up by the amount of urea used, so that the reaction was 78% complete in 76 minutes for the expanded urea while inappreciable for ordinary urea.

We have mentioned the use of expanded urea as the sole reagent to separate the fatty acids out of tall-oil. We have found further that such separation can be made highly selective by observing certain conditions of operation; thus, we can separate first the saturated fatty acids such as stearic acid; next we can separate fatty acids with a single double bond such as oleic; and next those with more than one double bond such as linoleic and linolenic acids. This selective effect can be obtained by taking advantage of the varying stability of the solids formed between urea and the fatty acids, as follows:

1. By limiting the amount of expanded urea added: When the amount of expanded urea added is less than that required to combine with the fatty acids present, the most stable solid compounds will form, and the smaller the amount of expanded urea, the more nearly will a single component be extracted.

2. By regulating the temperature at which solid phase with urea is formed: The urea solid-phase complex for each fatty acid has a transition temperature which is dependent on the solvent-fatty acid ratio. At or above this temperature it decomposes into a urea solid phase and the fatty acid which formed the solid phase with urea. Above the transition temperature, compound formation will not take place. This transition temperature for the adducts of saturated high molecular weight fatty acids is about 75° C.; hence these adducts will form up to this temperature.

3. By regulating the concentration of the solution from which the solid complex is formed: We have already mentioned that solid complex formation in general decreases with the concentration of the liquid phase. From the more dilute solutions, the more stable solid complexes form with expanded urea.

4. By allowing the urea-complex formation to take place from a concentrated solution of tall-oil at ordinary low temperature, e. g. 50° C. to 35° C. and using an excess of expanded urea, very complete separation of fatty acids from rosin acids can be obtained. The separated solid phase is then heated to successively higher temperatures in contact with a suitable solvent which is not a solvent for urea. Partial decomposition occurs at each temperature. The various fractions of the recovered fatty acids so obtained will be in the order of stability of the solid phases, the more unstable being recovered at the lowest decomposition temperatures. The saturated fatty acids are not appreciably liberated until 75° C. is exceeded.

The practice of the invention will become further apparent upon a consideration of the following examples of our process:

*Example I*

Separation of tall-oil into fatty acids and rosin acids:
(a) The tall-oil used had the following approximate composition:

| | Percent |
|---|---|
| Rosin acids | 30 to 35 |
| Fatty acids | 60 to 65 |
| Non-acidic | 5 |

100 grams of this material was dissolved in a petroleum fraction (largely hexane) to make a total of 250 cc. To this was added as the sole reagent 223 grams of expanded urea (obtained as described in Example IV which follows.) The mixture was shaken at 19°–20° C. for forty minutes, the solid phase then removed by filtration and washed with a small amount of the same petroleum fraction. The solid phase was then dried and weighed. The acids were recovered from the solid phase by decomposing with water and suitably recovering and weighing the acids. The recovered material had the physical characteristics of fatty-acid mixtures. It is a relatively non-viscous liquid above 35° C. It solidifies to a typical waxy solid at about 20° C. Following are the results:

| | Grams |
|---|---|
| Original weight of tall-oil | 100 |
| Original weight of urea | 223 |
| Weight of solid phase formed | 278.6 |
| Weight of fatty acids from solid phase | 54.8 |
| Molecular weight of recovered fatty acids (by titration) | 291 |
| Molecular weight of original tall-oil | 308 |
| Iodine number of recovered acids | 124.1 |

(b) The operation was continued by adding to the filtrate from (a) an additional 32 grams of the expanded urea. A solid phase again formed rapidly and was treated as before. The recovered fatty acid was a liquid at 20° C., having the physical characteristics of linoleic acid. The results were:

| | Grams |
|---|---|
| Urea used | 32 |
| Solids phase recovered | 39.3 |
| Weight of acids | 6.7 |
| Weight of urea | 32.6 |
| Molecular weight of acids | 282.0 |
| Iodine number of acids | 184.5 |

Combining (a) and (b), we have as the overall result:

| | Grams |
|---|---|
| Total urea used | 255 |
| Total solid phase recovered from 100 g. tall-oil | 317.9 |
| Total fatty acids recovered | 61.5 |
| Total fatty acids estimated in 100 g. tall-oil | 60 to 65 |
| Total urea recovered | 256.4 |

From the filtrate and washings the hydrocarbon was evaporated. There was left 37.5 grams of rosin acids in the form of a viscous, amber colored, sticky liquid which crystallized at room temperature to a resinous solid melting above 100° C. and having a molecular weight (by titration) of 344.

A number of points are brought clearly into view by these operations:

1. The separation of the fatty acids has been quantitative within the limits of knowledge of the original composition of the tall-oils and within the limits of experimental error.

2. The recovery of the rosin acids has been quantitative in the same sense as above.

3. The recovery of urea has been quantitative in the same sense as above.

4. The fatty acids recovered from the second treatment had a much higher iodine number and lower molecular weight than those recovered in the first treatment. This illustrates the selective nature of the process when the amount of expanded urea used is varied.

*Example II*

The following will illustrate the selective effect of temperature on decomposition of the urea-fatty acids; three portions of the solid fatty-acid-urea complex prepared as described from tall-oil in Example I, were suspended in iso-octane and maintained at various temperatures for about one-half hour, after which time no further change was found to take place. In each case, the iso-octane solution was separated from the solid phase and its fatty acid content recovered and weighed.

| Temperature | Percent of Decomposition | Iodine No. of Recovered Fatty Acids |
|---|---|---|
| 40° C | 5.4 | 185.0 |
| 68° C | 19.8 | 180.0 |
| 99° C | 100.0 | 124.1 |

Example III

The following will further illustrate the selective action of solid complex formation with urea.

A single portion of the same fatty acid-urea complex used in Example II was successively treated at three different temperatures and the fatty acids released were recovered. Following are the results:

| Temperature | Percent of F. A. Recovered | Iodine Number |
|---|---|---|
| 40° C | 5.4 | 185 |
| 68° C | 14.4 | 178 |
| 100° C | 80.2 | 99 |

It is evident that by closer selection of temperatures, closer segregation of fractions will be obtained. It will also be evident to those skilled in chemical engineering that the first fractions can again be fractionated by the same treatment and as close a separation as desired, or as economically feasible, be thus attained. Commenting more specifically on the above results, the principal fatty acid constituents of tall-oil are linoleic acid and oleic acid, respectively of iodine numbers 180 and 90. The first two fractions above were largely linoleic acid while the third was largely oleic acid.

The following points are also illustrated by Examples II and III:

The extent of decomposition of the solid-phase urea-fatty acids is a function of the temperature. A state of equilibrium is reached between the liquid and solid phase at which the concentration of fatty acids in the two phases is fixed.

The fatty acids having the highest iodine number, that is, those having the greatest degree of unsaturation, decompose selectively at the lower temperature. Decomposition is substantially complete at some temperature lying between 68° C. and 99° C. (the boiling point of iso-octane). These statements are applicable when the suspending liquid is a solvent for the fatty acids, but not for urea.

The expanded urea can be prepared separately and we will describe three methods for the preparation of expanded urea such as that used in Examples I, II and III.

Example IV

Sufficient commercial lauric acid was dissolved in a mixture of 100 volumes of iso-octane and approximately 16 volumes of anhydrous methanol, to make approximately 10% lauric acid by weight. To this, approximately 3.3 parts by weight of ordinary commercial urea were added for each weight of lauric acid. The mixture was agitated at ordinary room temperature for about one hour. The solid was filtered, washed with iso-octane, and suspended in iso-octane; the temperature was then raised to the boiling point of iso-octane (99° C.) and maintained for about 15 minutes. The liquid phase was removed while hot; the urea was collected and washed with hot iso-octane. The filtrate from the urea can be used over and over to make more batches of expanded urea.

Example V

Sufficient paraffin wax (M. P. 45° C.) was dissolved in a methanol-toluol mixture containing about 30% by volume methanol to make a 20% solution. To this was added 2.4 weights of urea per weight of paraffin wax. The mixture was agitated one hour at 19°–20° C. The solid phase was filtered and then suspended in toluol. It was raised to the boiling point (110° C.) for about thirty minutes and then filtered hot. The solid phase was our expanded urea, and it is of special interest to note that this expanded urea, prepared by using a hydrocarbon, was just as reactive towards fatty acids as those batches prepared from tall-oil fatty acids, or from pure lauric acid. Conversely, we have found that our expanded urea, prepared by using a fatty acid, will form a solid phase without the need for an accelerator, with hydrocarbons capable of forming, under suitable and known conditions, a solid-phase with ordinary urea.

The expanded urea thus formed is an extremely light, fluffy powder which will combine with suitable organic compounds very rapidly and without the presence of an accelerator.

Expanded urea can also be made by a direct precipitation of the urea-organic complex from a urea solvent which also dissolves fatty acids, and then decomposing the solid complex as previously described. The following example is cited to show this:

Example VI

A saturated solution of urea in methanol was made at about 25° C. When 5 grams of commercial oleic acid were added to 100 grams of the urea solution, an immediate voluminous precipitate formed. This precipitate was collected, washed with toluol and suspended in 100 cc. of toluol. The suspension was heated to the boiling point of toluol (110° C.) and maintained there about ten minutes. The solid-phase, consisting of expanded urea, was collected.

The above directions need not be strictly adhered to: The aim is to form a solid phase urea-organic compound at a low temperature and decompose it at a high temperature but below the melting point of urea and in the presence of a solvent for the organic compound which is not a solvent for urea so that the bulk of the compound is separated from the urea solid phase. It will be obvious to those skilled in the art that this process of making expanded urea can be continuous and that fatty acids other than lauric or those in tall-oil, and that hydrocarbons other than paraffin wax, can be employed.

We will now describe one practical method of applying our invention to the treatment of tall-oil, the purpose being to segregate the total fatty acid content thereof from the rosin acids.

Step 1.—Dissolved tall-oil containing 60%–65% fatty acids in commercial hexane to make an approximately 50% (by weight) solution.

Step 2.—Add expanded urea (such as is recovered from Step 4(b) below) in amount approximately 2.3 times the weight of tall-oil and agitate approximately fifteen minutes to one-half hour until the fatty acid is in solid phase with urea. The period of agitation depends on the temperature, less agitation being required at a higher temperature. If the temperature is about 15° C. as much as one-half hour may be required.

Step 3.—Filter and wash the solid phase with a small volume of cold hexane.

Step 4.—(a) From the filtrate and washings of Step 3, distill the hexane and return it to Step 1. The residue is the rosin acid content of the original tall-oil.

(b) Suspend the solid phase from Step 3 in iso-octane. Heat to the boiling point for five to ten minutes, filter while hot and wash the solid urea with a small amount of hot iso-octane.

Step 5.—(a) Return the expanded urea produced in Step 4(b) to Step 2.

(b) From the filtrate of Step 4(b), distill the octane and return it to Step 4(b). The residue is the fatty acid content of the original tall-oil.

We have described the process as using hexane and iso-octane as suitable solvents. Other hydrocarbons which will not form solids with urea can be used equally well. We have found, for example, that toluol is very well suited for use throughout and the use of a single hydrocarbon in place of two simplifies the process.

While the invention has been described as applied to tall-oil, it will be obvious that, in its broader aspects, it can be applied to the separation and recovery of fatty acids from other mixtures wherein the fatty acids are in the presence of substances as inert to urea as are the rosin acids and other compounds in tall-oil, and also to the fractionation of mixtures of high molecular weight fatty acids.

This application is a continuation-in-part of our application Serial No. 140,344, filed January 24, 1950, now abandoned.

We claim:

1. In a process for recovering straight-chain-fatty acid components of more than ten carbon atoms from their solution in hydrocarbon, the step of adding to the said solution at a temperature below 75° C. expanded urea as the sole reagent to form a solid adduct of the said fatty acids and urea; said hydrocarbon being one which does not form solid adduct with urea, and which is not a solvent for urea.

2. In a process for recovering the fatty-acid components of tall-oil substantially free from rosin acids, the step of adding to a hydrocarbon solution of tall-oil at a temperature below 75° C. expanded urea as the sole reagent to form a solid adduct of straight-chain-fatty acids of more than ten carbon atoms and urea; said hydrocarbon solvent being one which does not form solid adduct with urea and which is not a solvent for urea.

References Cited in the file of this patent

UNITED STATES PATENTS

| | | |
|---|---|---|
| 2,518,677 | Garner et al. | Aug. 15, 1950 |
| 2,577,202 | Lien et al. | Dec. 4, 1951 |
| 2,596,344 | Newey et al. | May 13, 1952 |
| 2,613,204 | Fetterly | Oct. 7, 1952 |
| 2,634,261 | Fetterly | Apr. 7, 1953 |
| 2,670,343 | Fetterly | Feb. 23, 1954 |